United States Patent
Kaga et al.

(10) Patent No.: US 11,705,594 B2
(45) Date of Patent: Jul. 18, 2023

(54) METAL-AIR CELL, AND METHOD FOR MANUFACTURING METAL-AIR CELL

(71) Applicant: SHARP KABUSHIKI KAISHA, Osaka (JP)

(72) Inventors: Masaki Kaga, Osaka (JP); Hirotaka Mizuhata, Osaka (JP); Shinobu Takenaka, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 719 days.

(21) Appl. No.: 16/636,748

(22) PCT Filed: Jul. 31, 2018

(86) PCT No.: PCT/JP2018/028685
§ 371 (c)(1),
(2) Date: Feb. 5, 2020

(87) PCT Pub. No.: WO2019/031311
PCT Pub. Date: Feb. 14, 2019

(65) Prior Publication Data
US 2020/0243937 A1   Jul. 30, 2020

(30) Foreign Application Priority Data
Aug. 7, 2017   (JP) .............................. JP2017-152640

(51) Int. Cl.
*H01M 4/02* (2006.01)
*H01M 12/06* (2006.01)
(Continued)

(52) U.S. Cl.
CPC ............ *H01M 12/06* (2013.01); *H01M 12/08* (2013.01); *H01M 50/178* (2021.01); *H01M 50/186* (2021.01); *H01M 50/193* (2021.01); *H01M 50/197* (2021.01); *H01M 50/198* (2021.01); *H01M 50/46* (2021.01); *H01M 50/55* (2021.01);
(Continued)

(58) Field of Classification Search
CPC ..................................................... H01M 4/02
See application file for complete search history.

(56) References Cited

U.S. PATENT DOCUMENTS 3,700,912 A   10/1972   Glass et al.
5,362,577 A   11/1994   Pedicini
(Continued)

FOREIGN PATENT DOCUMENTS

JP   S5129950 B1   8/1976
JP   H09500480 A   1/1997
(Continued)

*Primary Examiner* — Jacob B Marks
(74) *Attorney, Agent, or Firm* — ScienBiziP, P.C.

(57) ABSTRACT

A metal-air cell comprises a negative electrode, a negative electrode case housing the negative electrode, sealed while a lead of the negative electrode extends from the negative electrode case, including a separator that forms at least part of the negative electrode case, an air electrode facing the negative electrode across the separator, and a cell case housing the negative electrode case and the air electrode and sealed while the lead of the negative electrode expands from the cell case and a lead of the air electrode expands from the cell case.

12 Claims, 14 Drawing Sheets

(51) Int. Cl.
  *H01M 12/08* (2006.01)
  *H01M 50/46* (2021.01)
  *H01M 50/557* (2021.01)
  *H01M 50/178* (2021.01)
  *H01M 50/55* (2021.01)
  *H01M 50/627* (2021.01)
  *H01M 50/186* (2021.01)
  *H01M 50/193* (2021.01)
  *H01M 50/198* (2021.01)
  *H01M 50/197* (2021.01)

(52) U.S. Cl.
  CPC ....... *H01M 50/557* (2021.01); *H01M 50/627* (2021.01)

(56) References Cited

U.S. PATENT DOCUMENTS

| | | | |
|---|---|---|---|
| 5,569,551 A | * | 10/1996 | Pedicini .............. H01M 12/065 429/405 |
| 2008/0102358 A1 | | 5/2008 | Kowalczyk et al. |
| 2012/0100440 A1 | | 4/2012 | Narula et al. |
| 2014/0262760 A1 | | 9/2014 | Hayes et al. |
| 2015/0364789 A1 | | 12/2015 | Ogawa et al. |
| 2017/0346147 A1 | | 11/2017 | Weisenstein et al. |

FOREIGN PATENT DOCUMENTS

| | | |
|---|---|---|
| JP | 2004-288572 A | 10/2004 |
| JP | 2015-005493 A | 1/2015 |
| JP | 2016046039 A | 4/2016 |
| JP | 2016-219248 A | 12/2016 |
| JP | 2016-225213 A | 12/2016 |
| JP | 2017041307 A | 2/2017 |
| JP | 2017-134931 A | 8/2017 |

\* cited by examiner

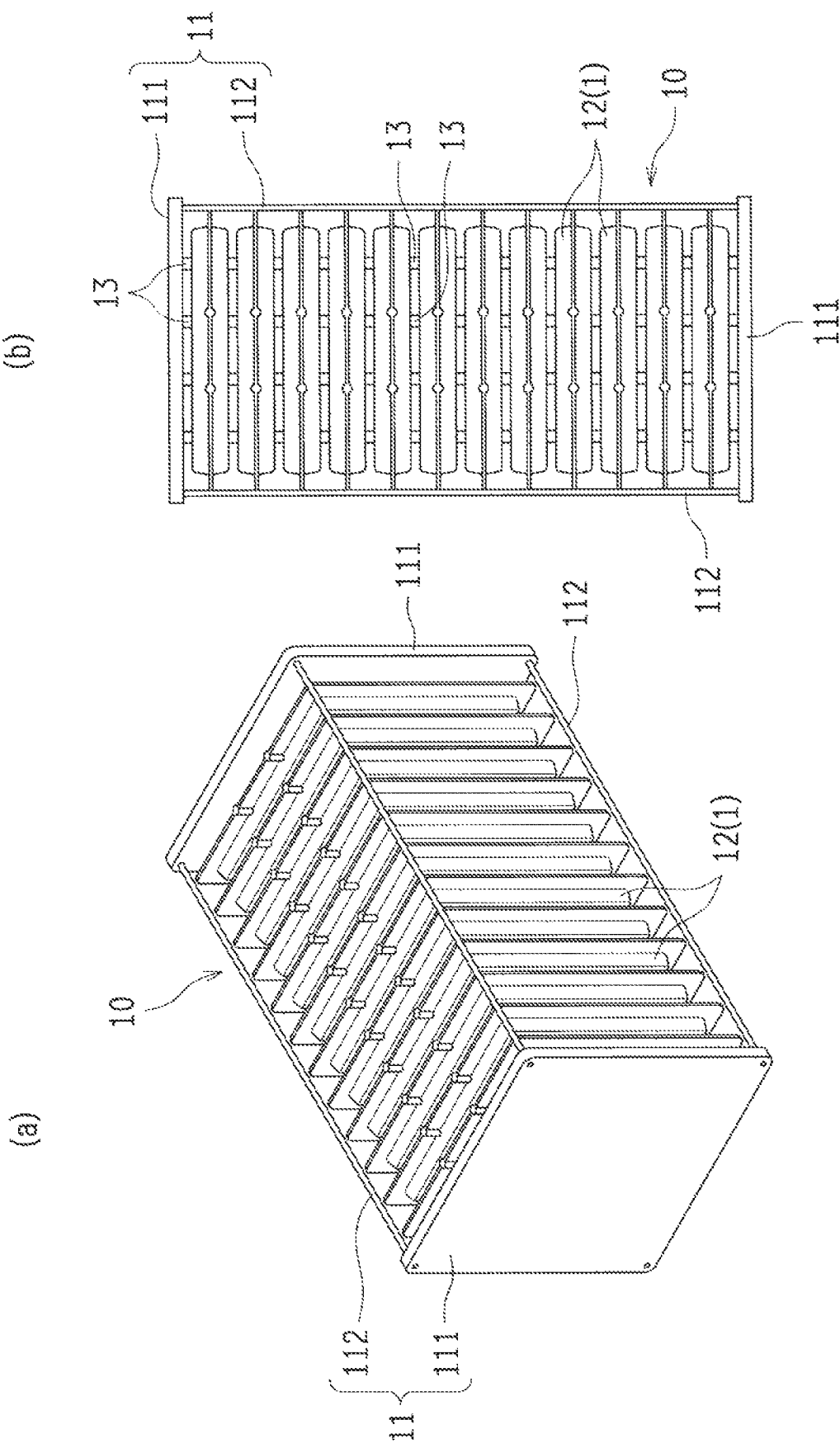

METAL-AIR CELL, AND METHOD FOR MANUFACTURING METAL-AIR CELL

TECHNICAL FILED

The present disclosure relates to a metal-air cell and a method for manufacturing the metal cell.

BACKGROUND ART

A metal-air cell includes an air electrode (a positive electrode), a metal negative electrode (a negative electrode), and an electrolyte layer.

For example, Patent Document 1 discloses a metal-air cell including a positive electrode, a negative electrode, and a separator provided between the positive electrode and the negative electrode, the metal-air cell being housed in an exterior container formed of a laminate sheet made of composite synthetic-resin film. This exterior container includes a positive laminate sheet and a negative laminate sheet. The positive laminate sheet includes at least one layer having one or more air holes, and at least another one layer acting as a water-repellent membrane.

CITATION LIST

Patent Literature

[Patent Document 1] Japanese Patent Application Publication No. 2004-288572

SUMMARY OF INVENTION

Technical Problem

In the above conventional metal-air cell, the positive electrode, the negative electrode, and the separator between the positive and negative separators are merely stacked one another, and not secured, in a single space inside the exterior container. Hence, the separator could be misaligned, which is likely to cause the growth of dendrites (needle-like metal deposits) resulting in short circuit between the positive and negative electrodes. Repetitive charge and discharge of a metal-air cell in such a structure inevitably causes uneven deposit of negative-electrode active material and the resulting deterioration in the cycle characteristic of the cell.

The present disclosure is conceived in view of the above problems and intends to provide a metal-air cell capable of reducing the growth of dendrites and reliably reducing the risk of short circuit between electrodes, and a method for manufacturing the metal-air cell.

Solution to Problem

In order to achieve the above intention, the present disclosure is directed to a metal-air cell including a cell case; and a positive electrode and a negative electrode housed in the cell case. As to this metal-air cell, the cell case includes a negative electrode case containing the negative electrode, the negative electrode case includes a porous structure unit of insulation, and is sealed while a lead leading to the negative electrode extends from an end of the negative electrode case, and the porous structure unit is provided between the negative electrode and the positive electrode.

Such features allows the lead leading to the negative electrode to extend out of the cell case without making contact with the electrolytic solution stored within the cell case but outside the negative electrode case. The above structure is capable of reducing generation of dendrites, making it possible to reduce the risk of short circuit between the electrodes.

As a specific configuration of the metal-air cell, preferably, the negative electrode case may include an opening (i) passing through, and communicating between an inside and an outside of, the negative electrode case, and (ii) provided to a face, of the negative electrode case, facing the negative electrode, and the opening may be provided with a separator having a porous structure of insulation and acting as the porous structure unit.

Such features make it possible to reduce deposition of the dendrites, or permeation and dissolution of metal ions through, the separator.

Moreover, a method of manufacturing the metal-air cell according to the above configurations is also within the technical scope of the present disclosure. Specifically, the present disclosure is directed to a method for manufacturing a metal-air cell including a cell case containing a metal negative electrode, a discharge positive electrode provided close to one face of the metal negative electrode, and a charge positive electrode provided close to another face of the metal negative electrode. The method for manufacturing this metal-air cell includes steps of: (a) forming a negative electrode case including providing openings each made on one of facing side faces of the negative electrode case, and blocking each of the openings with a separator, thereby forming the negative electrode case in a shape of a closed-bottomed bag with an upper end of the negative electrode case open; (b) forming a negative electrode including housing the metal negative electrode in the negative electrode case, and arranging a first negative electrode surface of the metal negative electrode and a second negative electrode surface of the metal negative electrode across from the first negative electrode surface to face a corresponding one of separators including the separator; and (c) sealing the negative electrode case including sealing the upper end of the negative electrode case while a lead leading to the metal negative electrode extends from the upper end, and sealing by thermal bonding an outer face of the upper end of the negative electrode case and an inner face of the cell case.

Such features make it possible to form a metal-air cell allowing the lead of the negative electrode to extend out of the cell case without making contact with the electrolytic solution stored within the cell case but outside the negative electrode case. This structure is capable of reducing generation of dendrites, making it possible to reduce the risk of short circuit between the electrodes.

Advantageous Effects of Invention

As to the metal-air cell and the method for manufacturing thereof according to the present disclosure, the cell case includes the negative electrode case containing: the negative electrode; and the porous structure unit provided between the negative electrode and the positive electrode. Such features make it possible to reduce generation of dendrites and the risk of short cut between the electrodes, contributing to improvement in cell performance.

BRIEF DESCRIPTION OF DRAWINGS

FIG. 18(a) is a perspective view and FIG. 18(b) is a top view illustrating a battery-cell stack including metal-air cells according to the present disclosure.

DESCRIPTION OF EMBODIMENTS

Figure 1:
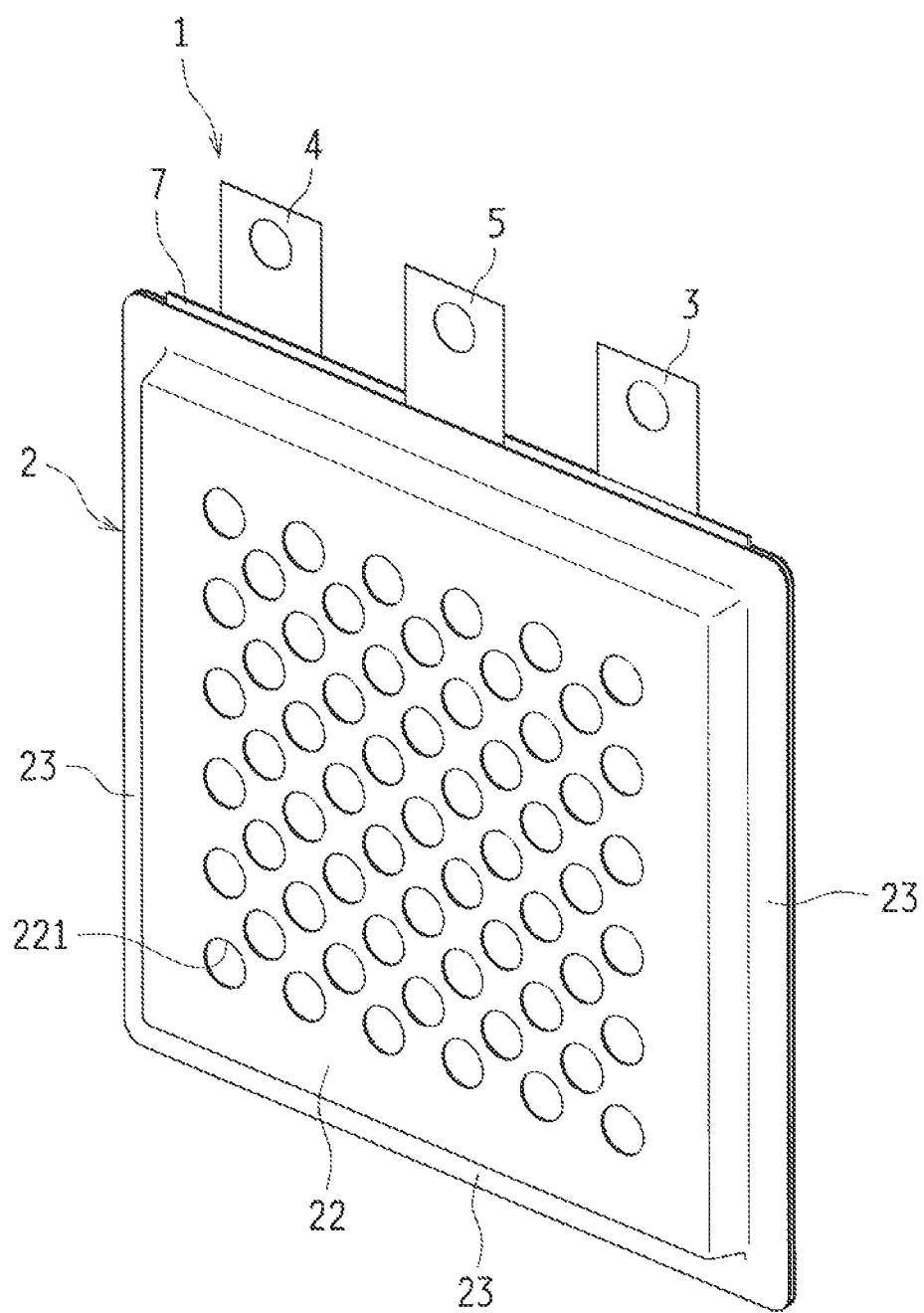
FIG. 1 is a perspective view illustrating a metal-air cell according to a first embodiment of the present disclosure.

Described below are a metal-air cell according to embodiments of the present disclosure and a method for manufacturing the metal-air cell with reference to the drawings.

First Embodiment

FIGS. 1 to 6 illustrate a metal-air cell according to a first embodiment of the present disclosure. A metal-air cell 1 according to the first embodiment includes in a cell case 2: a metal negative electrode 3 including metal acting as an electrode active material; a discharge positive electrode (an air electrode) 4 to be used as a positive electrode in discharge; a charge positive electrode 5 to be used as a positive electrode in charge; and a separator (a barrier) 6 provided between the metal negative electrode 3 and the charge positive electrode 5 and between the charge positive electrode 5 and the discharge positive electrode 4.

Figure 2:
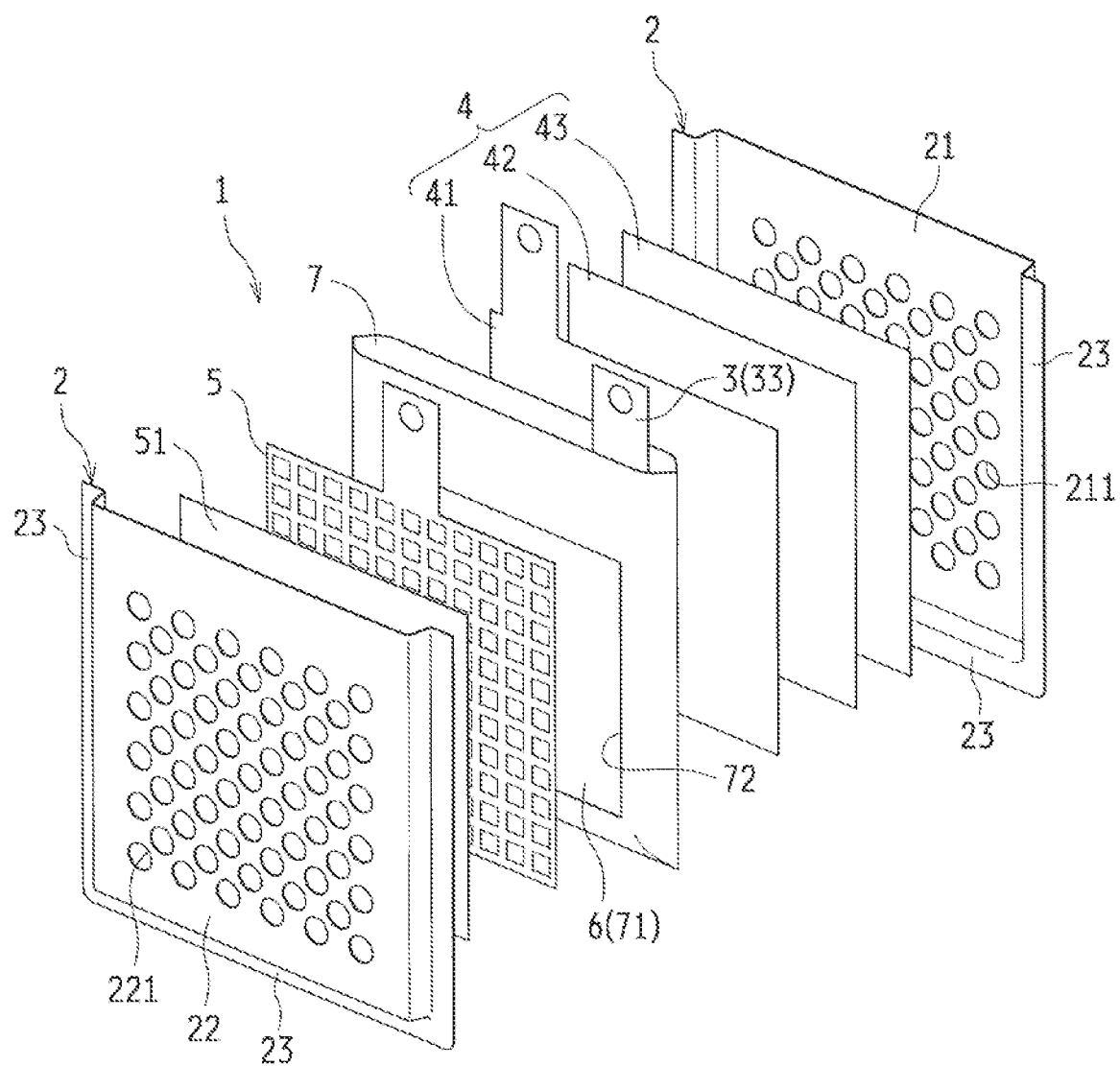
FIG. 2 is a schematic perspective view illustrating the metal-air cell disassembled into components.

The embodiments illustrated in FIGS. 1 and 2 exemplify as the metal-air cell 1 a three-electrode secondary cell having the cell case 2 filled with an electrolytic solution in which the metal negative electrode 3, the discharge positive electrode 4, and the charge positive electrode 5 are immersed and arranged in parallel with one another. Note that for the sake of explanation, the upper side of the metal-air cell 1 is assumed to face the upper side in FIG. 1 for the descriptions below.

In this metal-air cell 1, the discharge positive electrode 4, the negative electrode case 7 containing the metal negative electrode 3, and the charge positive electrode 5 are sequentially arranged in the cell case 2. Moreover, the metal-air cell 1 has a structure with not-shown layers of electrolytic solution between the electrodes. Described below in sequence are the components of the metal-air cell 1.

(Discharge Positive Electrode)

The discharge positive electrode 4 acts as a positive electrode in discharging the metal-air cell 1. The discharge positive electrode 4 has a catalyst capable of reducing oxygen, and acts as a positive electrode in discharging the metal-air cell 1. When an alkaline aqueous solution is used in the discharge positive electrode 4 as the electrolytic solution, a catalyst induces a reaction among water to be supplied from the electrolytic solution and oxygen gas and electrons to be supplied from the atmosphere, causing a discharge reaction generating hydroxide ions (OH—). In this discharge positive electrode 4, the discharge reaction proceeds in a three-phase interface in which oxygen (a gas phase), water (a liquid phase), and an electron conductor (a solid phase) coexist.

The discharge positive electrode 4 is provided to defuse the oxygen gas included in the atmosphere. For example, the discharge positive electrode 4 is provided so that at least a portion of the surface of the discharge positive electrode 4 is exposed to the atmosphere. In this exemplified embodiment, the cell case 2 to be described later is provided with many air inlets 211. Through these air inlets 211, the oxygen gas included in the atmosphere is diffused in the discharge positive electrode 4. Note that, unlike this exemplified embodiment, the metal-air cell 1 may be configured so that the water is supplied to the discharge positive electrode 4 through the air inlets 211.

The discharge positive electrode 4 illustrated in FIG. 2 includes: a discharge positive electrode current collector 41; a discharge positive electrode catalyst layer 42 including a catalyst capable of reducing the oxygen; and a water-repellent membrane 43.

Preferably, the discharge positive electrode current collector 41 is made of a porous and electron-conductive material. In the use of an alkaline aqueous solution as the electrolytic solution, the material is preferably made of a metallic material such as nickel or stainless whose surface is plated with nickel in view of corrosion resistance. The discharge positive electrode current collector 41 can be porous, using such materials as mesh, expanded metal, punched metal, a sintered body made of metallic particles or metallic fibers, and foamed metal.

The discharge positive electrode current collector 41 may also function as a gas diffusion layer. Here, the discharge positive electrode current collector 41 may be either (i) carbon paper and carbon cloth whose surface is finished with water-repellent resin or (ii) a porous sheet made of carbon black and water-repellent resin. The water-repellent resin is provided to reduce the leak of the electrolytic solution from the cell case 2. The water-repellent resin is capable of separating gas from liquid, and does not block the supply of the oxygen gas to the discharge positive electrode catalyst layer 42.

Preferably, the discharge positive electrode catalyst layer 42 may include, for example, a conductive porous carrier, and a catalyst carried by the porous carrier. Such a feature makes it possible to allow the catalyst to form the three-phase interface in which oxygen, water, and electrons coexist, contributing to the proceeding of the discharge reaction. As the catalyst included in the catalyst layer and capable of reducing oxygen, an example of such a catalyst includes an oxygen-reducing catalyst. Examples of the oxygen-reducing catalyst includes (i) a platinum group such as nickel, palladium, and platinum, (ii) a perovskite oxide including transition metal such as cobalt, manganese, and iron, (iii) a noble metal oxide such as ruthenium and palladium, and (iv) a manganese oxide.

The water-repellent membrane 43 is a porous material containing water-repellent resin. The water-repellent membrane 43 is provided across the discharge positive electrode catalyst layer 42 from the discharge positive electrode current collector 41 (that is, across from the metal negative electrode 3). The water-repellent membrane 43 provided can reduce the leak of the electrolytic solution. Preferably, an example of the water-repellent resin to be used for the water-repellent membrane 43 is polytetrafluoroethylene (PTFE).

The discharge positive electrode 4 can be electrically connected to a discharge positive electrode terminal (an air electrode terminal), and can lead charges generated in the discharge positive electrode catalyst layer 42 to a not-shown external circuit.

(Charge Positive Electrode)

The charge positive electrode 5 is a porous electrode acting as a positive electrode in charging the metal-air cell 1. Furthermore, the charge positive electrode 5 is catalytically active to generate oxygen. In the use of an alkaline aqueous solution as an electrolytic solution, the charge positive electrode 5 causes a reaction to generate oxygen, water, and electrons from hydroxide ions (i.e., a charge reaction). Specifically, in the charge positive electrode 5, the charge reaction proceeds in a three-phase interface in Which oxygen (a gas phase), water (a liquid phase), and an electron conductor (a solid phase) coexist.

The charge positive electrode 5 is provided so that gas such as oxygen gas generated by the proceeding charge reaction can diffuse. For example, the charge positive electrode 5 is provided so that at least a portion of the charge positive electrode 5 communicates with external air. In the exemplified embodiment, the cell case 2 to be described later is provided with many gas outlets 221. Through these gas outlets 221, the gas such as the oxygen gas to be generated by the charge reaction is ejected from the charge positive electrode 5.

Preferably, the charge positive electrode 5 is a porous and electron-conductive material. In the use of an alkaline aqueous solution as the electrolytic solution, the material is preferably made of a metallic material such as nickel or stainless whose surface is plated with nickel in view of corrosion resistance and the catalytic activity to generate oxygen in response to the charge reaction. The charge positive electrode 5 can be porous, using such materials as mesh, expanded metal, punched metal, a sintered body made of metallic particles and metallic fibers, and foamed metal. A surface of the charge positive electrode 5 may have oxygen generating catalytic particles to promote the charge reaction. Moreover, the charge positive electrode 5 may include a not-shown charge positive electrode current collector.

The charge positive electrode 4 also includes a water-repellent membrane 51 similar to the water-repellent membrane 43 included in the discharge positive electrode 4. This water-repellent membrane 51 is made of a porous material containing water-repellent resin. The water-repellent membrane 51 is provided across from the metal negative electrode 3 (that is, close to the cell case 2). The water-repellent membrane 51 provided can reduce the leak of the electrolytic solution through the charge positive electrode 5. Furthermore, the water-repellent membrane 51 provided can separate such gas as oxygen gas to be generated by the charge reaction from the electrolytic solution, and eject the separated gas out of the cell case 2 through the gas outlets 221.

The charge positive electrode 5 can electrically connect to a charge positive electrode terminal, and supply from a not-shown external circuit charges required for the charge reaction.

(Metal Negative Electrode)

The metal negative electrode 3 contains an active material (a negative-electrode active material), and causes an oxidation reaction of the active material in discharge and a reduction reaction in charge. Examples of the active material include such metallic elements as zinc, lithium, sodium, calcium magnesium, aluminum, and iron.

When the metallic element is zinc, the metallic zinc experiences an oxidation reaction in discharge. Specifically, the oxidization of zinc may result in either case: that is, the oxidized zinc may dissolve in the electrolytic solution as zincate ions, or zinc oxide and zinc hydroxide are directly generated. In charge, the oxidized zinc experiences a reduction reaction to the metallic zinc. Specifically, the reduction reaction may result in either case: that is, the zincate ions dissolved in the electrolytic solution is reduced to generate zinc, or the zinc oxide and zinc hydroxide are directly reduced to zinc.

Figure 5:
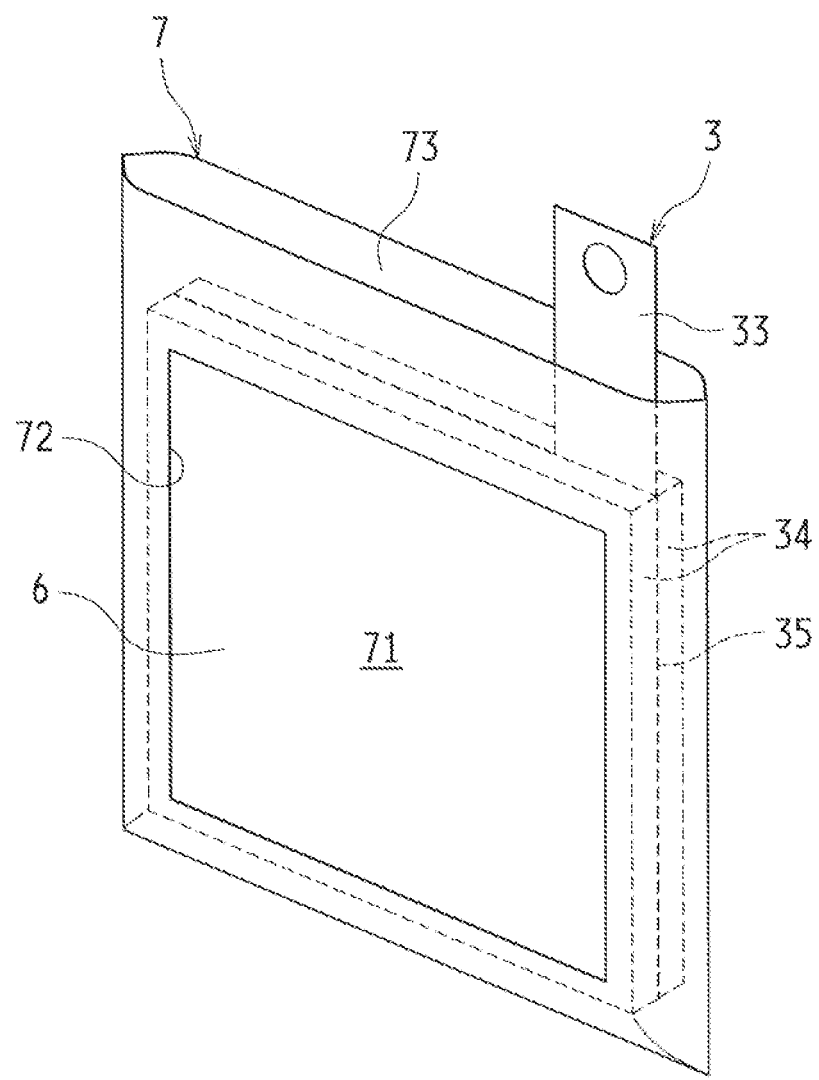
FIG. 5 is a perspective view illustrating an example of a negative electrode case included in the metal-air cell.
Figure 6:
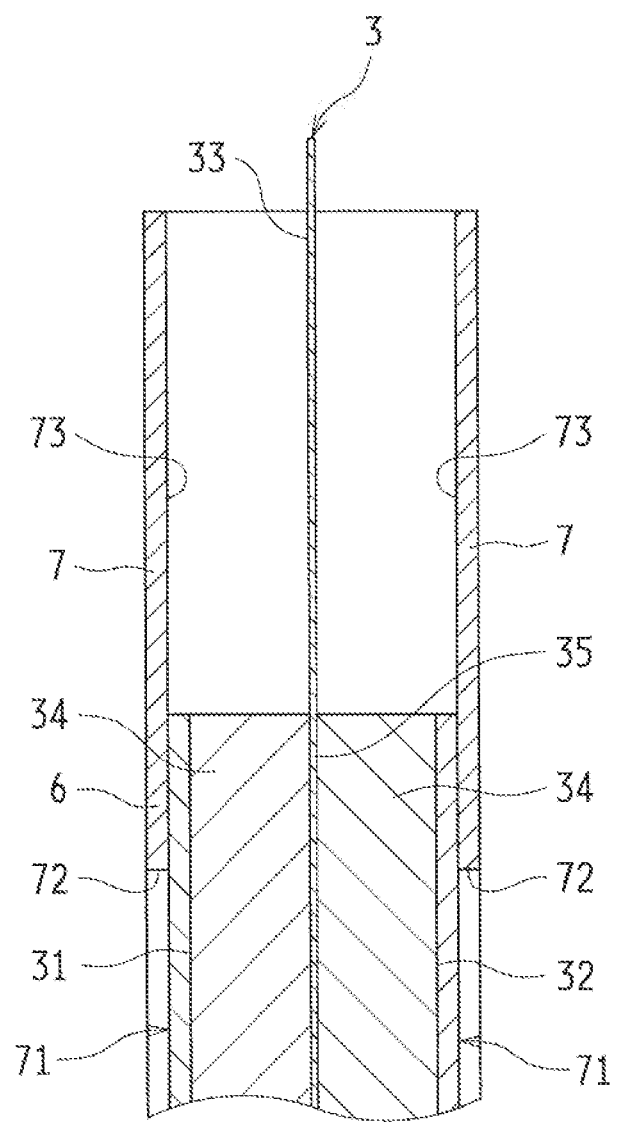
FIG. 6 is a cross-sectional view illustrating an upper portion of the negative electrode case in FIG. 5.

The metal negative electrode 3 is contained in the negative electrode case 7 and provided inside the cell case 2. FIG. 5 is a schematic perspective view illustrating the negative electrode case 7 containing the metal negative electrode 3. FIG. 6 is a cross-sectional view illustrating an upper portion of the negative electrode case 7.

The negative electrode case 7 includes a porous structure unit 71 of insulation, and formed in a shape of a closed-bottomed bag with one end open. This negative electrode case 7 houses the metal negative electrode 3, while a lead 33 of the metal negative electrode 3 extends from an upper opening end of the negative electrode case 7.

The porous structure unit 71 is provided with a separator 6. In the exemplified embodiment, the negative electrode case 7 is provided with at least one opening 72 passing through, and providing communication between the inside and the outside of, the negative electrode case 7. One of the openings 72 is provided to a face, of the negative electrode case 7, facing a first negative electrode surface 31 of the metal negative electrode 3, and another one of the openings 72 is provided to a face, of the negative electrode case 7, facing a second negative electrode surface 32 across from the first negative surface 31, such that the openings 72 face each other. Each of the openings 72 is provided with the separator 6 having a porous structure of insulation and acting as the porous structure unit 71. The opening 72 is formed smaller than the first negative electrode surface 31 and the second negative electrode surface 32 of the metal negative electrode 3, and narrower than the surface of the separator 6. Details of the separator 6 will be described later.

As illustrated in FIG. 6, the separator 6 is housed in the negative electrode case 7, and provided to block the opening 72 from inside the negative electrode case 7. In this case, the separator 6 is adhered or sealed to the four peripheries of the opening 72 to be integrally secured to the negative electrode case 7.

In the negative electrode case 7 configured in the above manner, the separator 6 (the porous structure unit 71) is provided between the metal negative electrode 3 and the discharge positive electrode 4 and between the metal negative electrode 3 and the charge positive electrode 5. Moreover, the negative electrode case 7 contains the metal negative electrode 3 to keep the metal negative electrode 3 from making direct contact with the cell case 2, and to provide in the cell case 2 reliable insulation between the metal negative electrode 3 and the discharge positive electrode 4 (the lead) and between the metal negative electrode 3 and the charge positive electrode 5 (the lead). Note that the porous structure unit 71 does not have to be formed of the separator 6. Alternatively, the porous structure unit 71 is formed in any given configuration as long as the porous structure unit 71 has insulation property and porous structure.

Since the negative electrode case 7 is formed in a shape of a closed-bottomed bag with the upper portion thereof open, making it possible to inject the electrolytic solution from this upper opening end into the negative electrode case 7. Provided to an upper-portion of the negative electrode case 7 is a heat-sealing portion 73 left as a margin for thermal bonding. After the electrolytic solution is injected, the heat-sealing portion 73 is thermally bonded so that the upper opening end of the negative electrode case 7 is sealed. Such a negative electrode case 7 is formed of, for example, one or more sheets of insulating film material folded and joined together.

Moreover, as illustrated in FIG. 1, with both the negative electrode case 7 and the cell case 2 sealed, an upper end of the negative electrode case 7 is preferably formed to protrude above an upper end of the cell case 2.

Such a feature can further reduce the risk of short circuit between the electrodes. Furthermore, the feature makes it possible to facilitate a condition check of both of the upper ends of the negative electrode case 7 and the cell case 2 by appearance. In the case where a leak of the electrolytic solution is found due to a malfunction such as improper thermal bonding, for example, the feature makes it possible to easily determine whether the leak is from the sealed portion of the negative electrode case 7 or from the sealed portion of the cell case 2 and the negative electrode case 7.

The material of the negative electrode case 7 does not have to be a particularly limited one, as long as the material has an insulating property required for this type of the metal-air cell 1 and is capable of functioning as an insulating member. Preferably, the negative electrode case 7 is made of a thermoplastic resin material with a good insulation property, a wrinkle-resistant finish, and a high heat-resisting property. Specifically, examples of the thermoplastic resin material preferably include such polyolefin-based resin materials as polyethylene (PE) and polypropylene (PP). The polyolefin-based resin materials preferably have a thickness of 0.2 mm or thinner, more preferably have a thickness ranging approximately from 30 to 150 μm, and still more preferably have a thickness ranging approximately from 50 to 100 μm.

As well as both the discharge reaction and the charge reaction, the metal negative electrode 3 contained in the negative electrode case 7 causes a reaction in which hydroxide ions (OH—) are involved in addition to the active material. Hence, the metal negative electrode 3 has to have a structure to allow for efficient contact of the electrolytic solution, acting as a conduction path for the active material and hydroxide ions (OH—). For example, the metal negative electrode 3 is formed to be a porous electrode including active material particles. Such a feature allows the electrolytic solution to penetrate voids between the active material particles, making it possible to enlarge a contact interface between the active material particles and the electrolytic solution. Moreover, the metal negative electrode 3 may contain a binder. The contained binder can bind the active materials together.

In the exemplified embodiment, the metal negative electrode 3 includes a negative-electrode active material layer 34 and a negative electrode current collector 35. In the embodiment illustrated in FIG. 6, the negative-electrode active material layer 34 is provided between the negative electrode current collector 35 and the separator 6. The negative electrode current collector 35 has: the first negative electrode surface 31 facing the discharge positive electrode 4; and the second negative electrode surface 32 located across from the first negative electrode surface 31 and facing the charge electrode 5. The lead 33 acting as a negative electrode terminal extends from the negative electrode current collector 35, making it possible to electrically connect to an external circuit. Such a feature can send a not-shown external circuit charges to be consumed or generated by the metal negative electrode 3.

Desirably, the negative electrode current collector 35 is made of a porous and electron-conductive material. Moreover, in view of reducing self-corrosion, the negative electrode current collector 35 is desirably made of a material having a high hydrogen overvoltage, or a metallic material such as stainless whose surface is plated with a material having a high hydrogen overvoltage. Furthermore, the negative electrode current collector 35 is preferably made of such materials as mesh, expanded metal, punched metal, a sintered body made of metallic particles or metallic fibers, and foamed metal.

The negative-electrode active material layer 34 includes a metallic element for a negative-electrode active material. The metallic element included in the negative-electrode active material layer 34 may be either reduced or oxidized. For example, the negative-electrode active material layer 34 may be formed of a zinc plate, a zinc oxide plate, particulate zinc, or zinc oxide. If the metallic element for the negative-electrode active material is zinc, the metallic element is metallic zinc when reduced, and is zinc oxide when oxidized. Hence, the metal negative electrode 3 including zinc can be taken out of the cell case 2 after discharge, and the zinc oxide can be reduced to zinc.

(Separator)

The separator 6 is made of an electronically insulating material. The separator 6 reliably provides insulation between the discharge positive electrode 4 and the metal negative electrode 3 and between the charge positive electrode 5 and the metal negative electrode 3, and allows for movement of charge carriers or ions between these members. In particular, the separator 6 reduces the risk of short circuit caused by an electron conducting path formed between the electrodes. For example, the separator 6 reduces the risk that metal dendrites are deposited on the metal negative electrode 3 by reduction in charge and reach the charge positive electrode 5, causing the short circuit.

The separator 6 may be made of a material typically used in this field. In this exemplified embodiment, the separator 6 is made of a sheet material having many small holes and a predetermined width. Preferably, an example of the separator 6 may be a solid electrolyte sheet such as a porous resin sheet and an ion exchange membrane. Moreover, the separator 6 can be a micro-porous membrane made of polyolefin-based resin.

The separator 6 may be in a single-layered structure such as the porous resin sheet or a multi-layered structure with the porous resin sheets stacked one another. An example of the multi-layered structure for the separator 6 includes a structure in which an anion-exchange membrane stacked between the separator 6 and the negative electrode case 7. Moreover, the multi-layered structure may also include a structure in which an anion-exchange membrane is provided between the negative electrode case 7 and the metal negative electrode 3 with the anion-exchange membrane covering the opening 74 from inside the negative electrode case 7. Such structures make it possible to reduce deposition of the dendrites or permeation and dissolution of metal ions through the separator 6.

Since the separator 6 is provided as the porous structure unit 71 of the negative electrode case 7, the separator 6 is to be sandwiched between the positive and negative electrodes. Through this separator 6, ions are conducted between the electrodes, making it possible to cause the charge reaction and the discharge reaction of the metal-air cell 1.

(Electrolytic Solution)

Immersed in the electrolytic solution are the metal negative electrode 3, the discharge positive electrode 4, and the charge positive electrode 5 in the cell case 2. The electrolytic solution is an ion-conductive liquid in which an electrolyte dissolves into the solvent. The type of the electrolytic solution varies depending on the type of the electrode active material included in the metal electrode. Preferably, the electrolytic solution may be made of a water solvent (an electrolyte aqueous solution).

When the metal-air cell 1 is a zinc air-metal cell, an aluminum air-metal cell, and an iron metal-air cell, an example of the electrolytic solution includes an alkaline aqueous solution such as a sodium hydrate aqueous solution and a potassium hydrate aqueous solution. When the metal-air cell 1 is a magnesium air-metal cell, an example of the electrolytic solution includes a sodium chloride aqueous solution. When the metal-air cell 1 is a lithium air-metal cell, an example of the electrolytic solution includes an organic electrolytic solution. The electrolytic solution may be additionally contain an organic additive and an inorganic additive other than the electrolyte, and may be made into gel with a polymeric additive.

(Cell Case)

Figure 3:
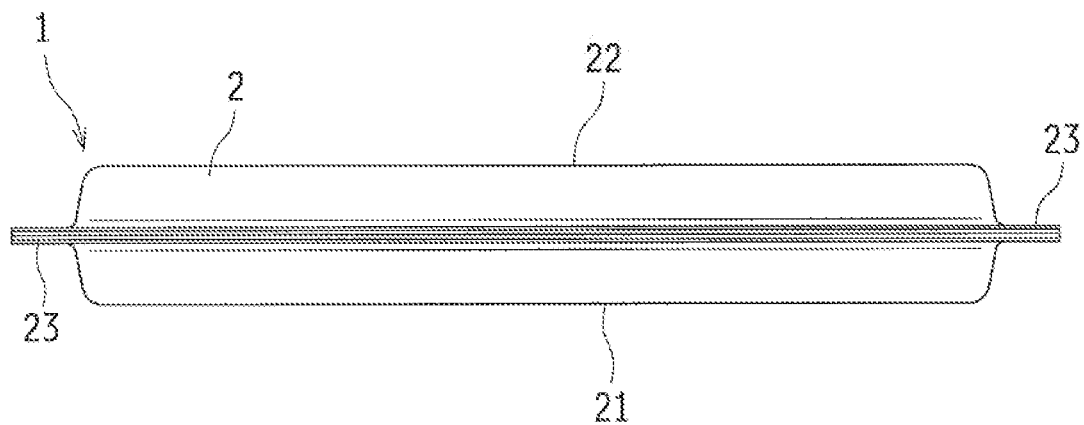
FIG. 3 is a bottom view of the metal-air cell.

The cell case 2 is an exterior container housing: the negative electrode case 7 containing the metal negative electrode 3 immersed in the electrolytic solution; the discharge positive electrode 4; and the charge positive electrode 5. In the exemplified embodiment, as illustrated in FIGS. 2 and 3, the cell case 2 includes a first main watt 21 and a second main wall 22 shaped into a substantial rectangle. From each of the first main wall 21 and the second main wall 22, a side wall 23 extends from both of right and tell edges and a lower edge thereof.

The first main wall 21 and the second main wall 22 have many openings formed through the front and rear surfaces thereof. Of these main watts, the first main wall 21 has the air inlets 211 in large number. Through these air inlets 211, the cell case 2 is capable of taking air therein. Moreover, the second main wall 22 has the gas outlets 221 in large number. Through these gas outlets 221, the cell case 2 is capable of ejecting such gas as oxygen generated in charge and staying near the charge electrode.

In the manufacturing process of the cell case 2, the first main wall 21 and the second main wall 22 are arranged to face each other and the side walls 23 are bonded together. Hence, the cell case 2 is formed in a shape of a closed-bottomed bag with an upper portion of the cell case 2 open. An upper end of the cell case 2 is open as an inlet to inject the electrolytic solution (see FIG. 7). The upper opening end of this cell case 2 is sealed by thermal bonding after the electrolytic solution is injected. The upper opening end of the cell case 2 may be sealed with the negative electrode case 7 held in the upper opening. Moreover, the upper opening end of the cell case 2 is sealed preferably bellow the upper end of the negative electrode case 7.

Preferably, a material of the cell case 2 may have corrosion resistance against the electrolytic solution, and have heat resistance and thermal adhesiveness. Examples of the material of the cell case 2 may preferably include polyvinyl chloride (PVC), polyvinyl acetate, acrylonitrile-butadiene-styrene (ABS) resin, vinylidene chloride, polyacetal, polyethylene, polypropylene, polyisobutylene, fluorine resin, and epoxy resin.

Figure 4:
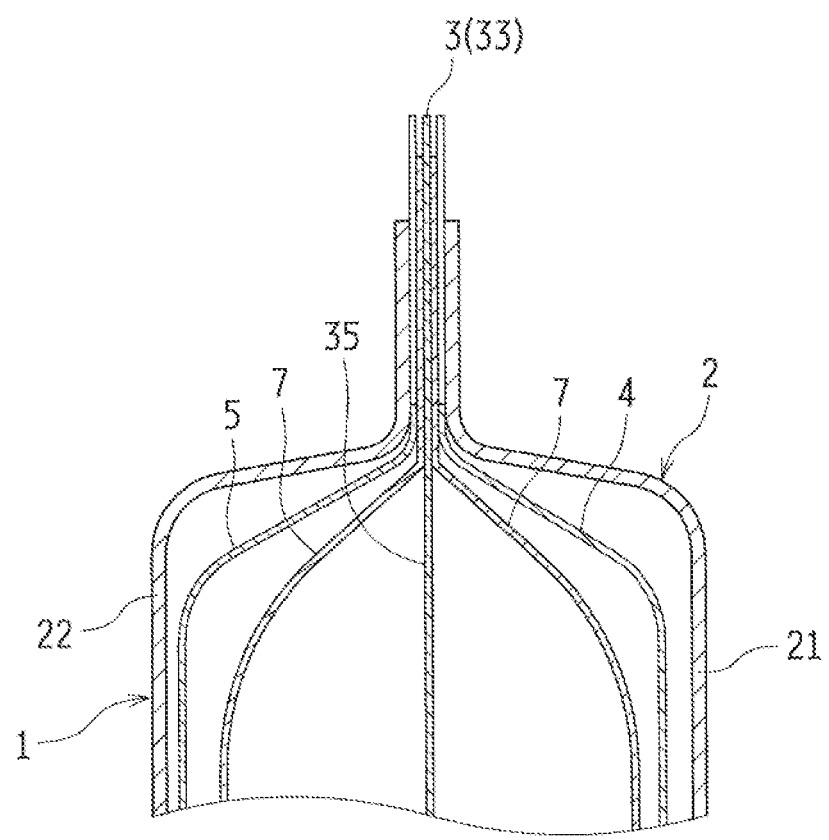
FIG. 4 is a cross-sectional view illustrating an upper portion of the metal-air cell.

As described above, in the metal-air cell 1, the metal negative electrode 3 is contained in the negative electrode case 7 inside the cell case 2. Such a structure allows the lead 33 of the metal negative electrode 3 to extend out of the cell case 2 without making contact with the electrolytic solution outside the negative electrode case 7. As illustrated in FIG. 4, the metal negative electrode 3 of the metal-air cell 1 does not make contact with the cell case 2, providing reliable insulation between the metal negative electrode 3 and an inner face of the cell case 2. The discharge positive electrode 4 and the charge positive electrode 5 in the cell case 2 are insulated with the negative electrode case 7 from, and thus kept from having contact with, the metal negative electrode 3. Hence, the metal-air cell 1 has a structure capable of reducing generation of dendrites, making it possible to reduce the risk of short circuit between the electrodes.

The metal-air cell 1 is applicable as, for example, a zinc air-metal cell, a lithium air-metal cell, a sodium air-metal cell, a calcium air-metal cell, a magnesium air-metal cell, an aluminum air-metal cell, and an iron air-metal cell. In particular, the metal-air cell 1 is preferably applicable as a zinc air-metal cell a metal negative electrode of which is made of a kind of zinc. A benefit of the zinc air-metal cell is its high safety since the zinc air-metal cell does not require the use of a flammable electrolytic solution (electrolyte) as, for example, a lithium air-metal cell does, and allows for the use of an alkaline electrolytic solution (electrolyte). Moreover, another benefit of the zinc air-metal cell is that a negative electrode of the zinc air-metal cell can be manufactured lower in cost than that of a lithium air-metal cell, contributing to easily providing the zinc air-metal cell with a large capacity.

Note that this embodiment exemplifies a three-electrode metal-air secondary cell as the metal-air cell 1. Alternatively, the metal-air cell 1 may be a primary cell without the charge positive electrode 5. Furthermore, the metal-air cell 1 may have a positive electrode including a catalyst capable of reducing and generating oxygen, so that the positive electrode can be used for both charge and discharge.

(Method for Manufacturing Metal-Air Cell)

Described next is a method for manufacturing the metal-air cell 1.

The metal-air cell 1 includes the components arranged as illustrated in FIG. 2. Of these components, first, the water-repellent membrane 43 of the discharge positive electrode 4 is thermally bonded to an inner face of the first main wall 21 of the cell case 2, so that the cell case 2 and the water-repellent membrane 43 are integrated together. Moreover, the discharge positive electrode catalyst layer 42 and the discharge positive electrode current collector 41 of the discharge positive electrode 4 are pressed and integrated together. Next, the first main wall 21 and the water-repellent membrane 43 integrated together, and the discharge positive electrode catalyst layer 42 and the discharge positive electrode current collector 41 integrated together are pressed and integrated together. Hence, the discharge positive electrode 4 is integrated with the first main wall 21. Moreover, the water-repellent membrane 51 of the charge positive electrode 5 is thermally bonded to an inner face of the second main wall 22 of the cell case 2, so that the second main wall 22 and the water-repellent membrane 51 are integrated together (forming a positive electrode).

Next, the first main wall 21 and the second main wall 22 are arranged to face each other, and the side walls 23 of the first main wall 21 and the second main wall 22 are thermally bonded together, so that both of the right and left edges and the lower edges of the cell case 2 are joined and integrated together. Hence, the cell case 2 is formed in a shape of a closed-bottomed bag with the upper portion of the cell case 2 open.

Next, a sheet material having a single-layered structure or a multi-layered structure to constitute the negative electrode case 7 is formed in a shape of a closed bottomed bag by thermal bonding. The side faces of the sheet material are provided with the respective openings 72 facing each other. Each of the two openings 72 facing each other is provided with the separator 6 a size of which corresponds to the shape of the opening 72, so that the separator 6 blocks the opening 72 from inside the negative electrode case 7. Hence, the negative electrode case 7 including the porous structure unit 71 is formed (forming a negative electrode case).

Next, the metal negative electrode 3 is housed in the negative electrode case 7. In the metal negative electrode 3, the first negative electrode surface 31 and the second negative electrode surface 32 across from the first negative electrode surface 31 are arranged to face the respective separators 6 (forming a negative electrode).

As illustrated in FIG. 6, in the negative electrode case 7, the negative-electrode active material layer 34 is provided to each side of the negative electrode current collector 35, and the separator 6 is provided outside the negative-electrode active material layer 34. Moreover, the metal negative electrode 3 is provided while the lead 33 of the metal negative electrode 3 extends from the upper opening end of the negative electrode case 7.

Figure 7:
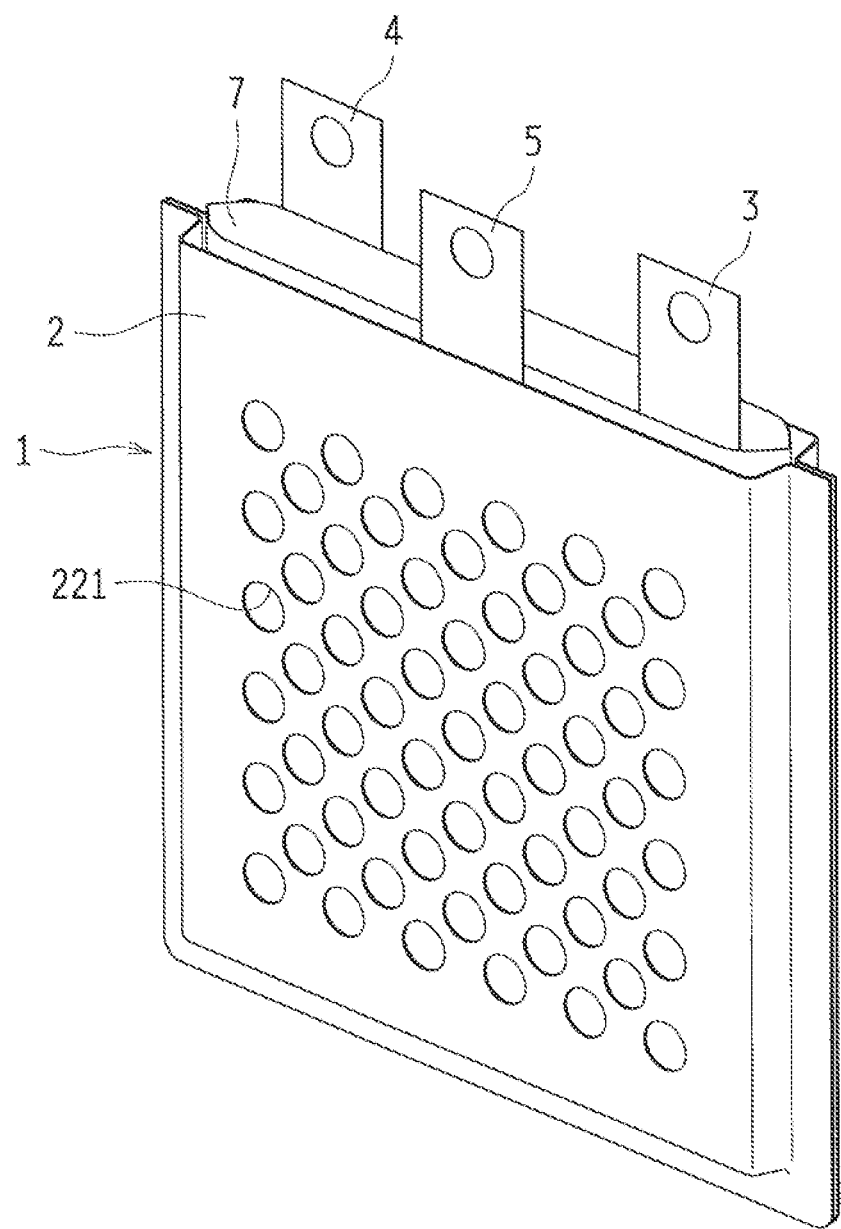
FIG. 7 is a perspective view illustrating a step in a method for manufacturing a metal-air cell according to the present disclosure.
Figure 8:
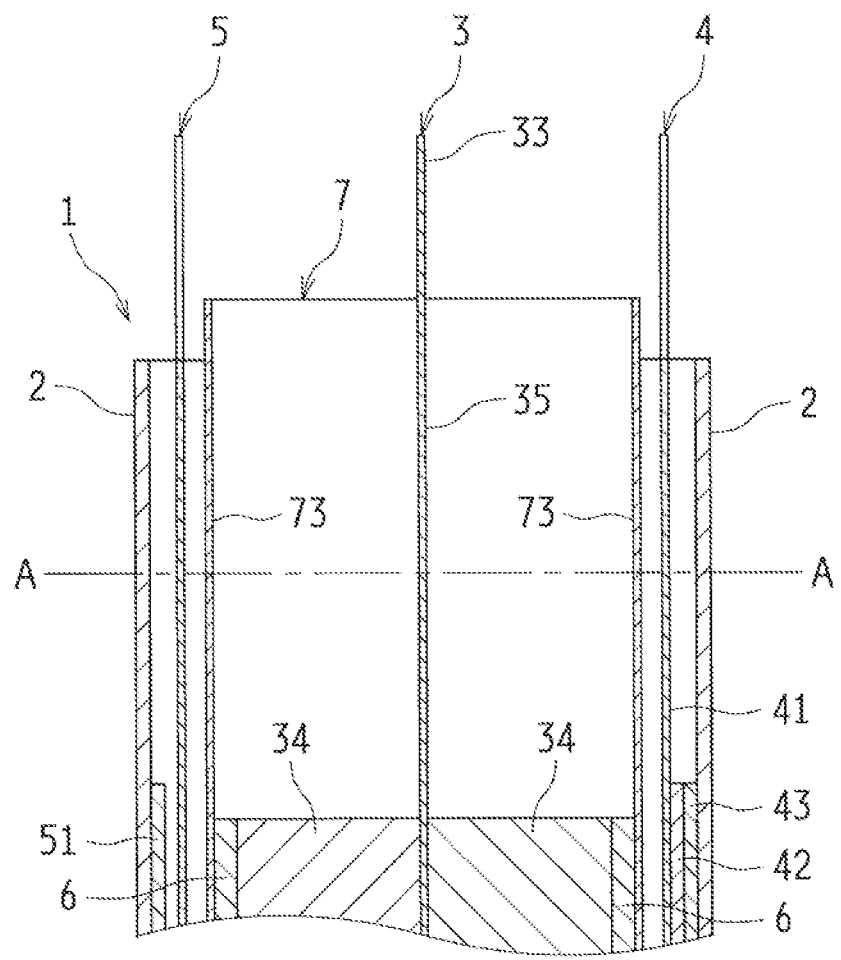
FIG. 8 is a cross-sectional view illustrating an upper portion of the metal-air cell in FIG. 7.

Then, the negative electrode case 7 is housed in the cell case 2, and the charge positive electrode 5 is housed between the negative electrode case 7 and the second main wall 22 of the cell case 2. As illustrated in FIGS. 7 and 8, the upper end of the negative electrode case 7 is exposed from the upper opening end of the cell case 2. Moreover, the discharge positive electrode 4 and the charge positive electrode 5 manufactured in the forming the positive electrode can be stacked together to face the negative-electrode active material layer 34 of the metal negative electrode 3 through the negative electrode case 7.

Then, the electrolytic solution is injected into the negative electrode case 7 illustrated in FIG. 8 from the upper opening end of the negative electrode case 7, and the metal negative electrode 3 is immersed in the electrolytic solution. Furthermore, the heat-sealing portion 73 is thermally bonded while the lead 33 leading to the metal negative electrode 3 extends from the upper opening end of the negative electrode case 7, and the upper opening end is sealed. The electrolytic solution is injected also from the upper opening end into the cell case 2 (a clearance between the inner face of the cell case 2 and the outer face of the negative electrode case 7), and the cell case 2 is sealed by thermal bonding (sealing the negative electrode case).

The cell case 2 is sealed by thermally bonding the outer face of the heat-sealing portion 73 of the negative electrode case 7 and the inner face of the cell case 2 together. The negative electrode case 7 and the cell case 2 can be simultaneously sealed.

Figure 9:
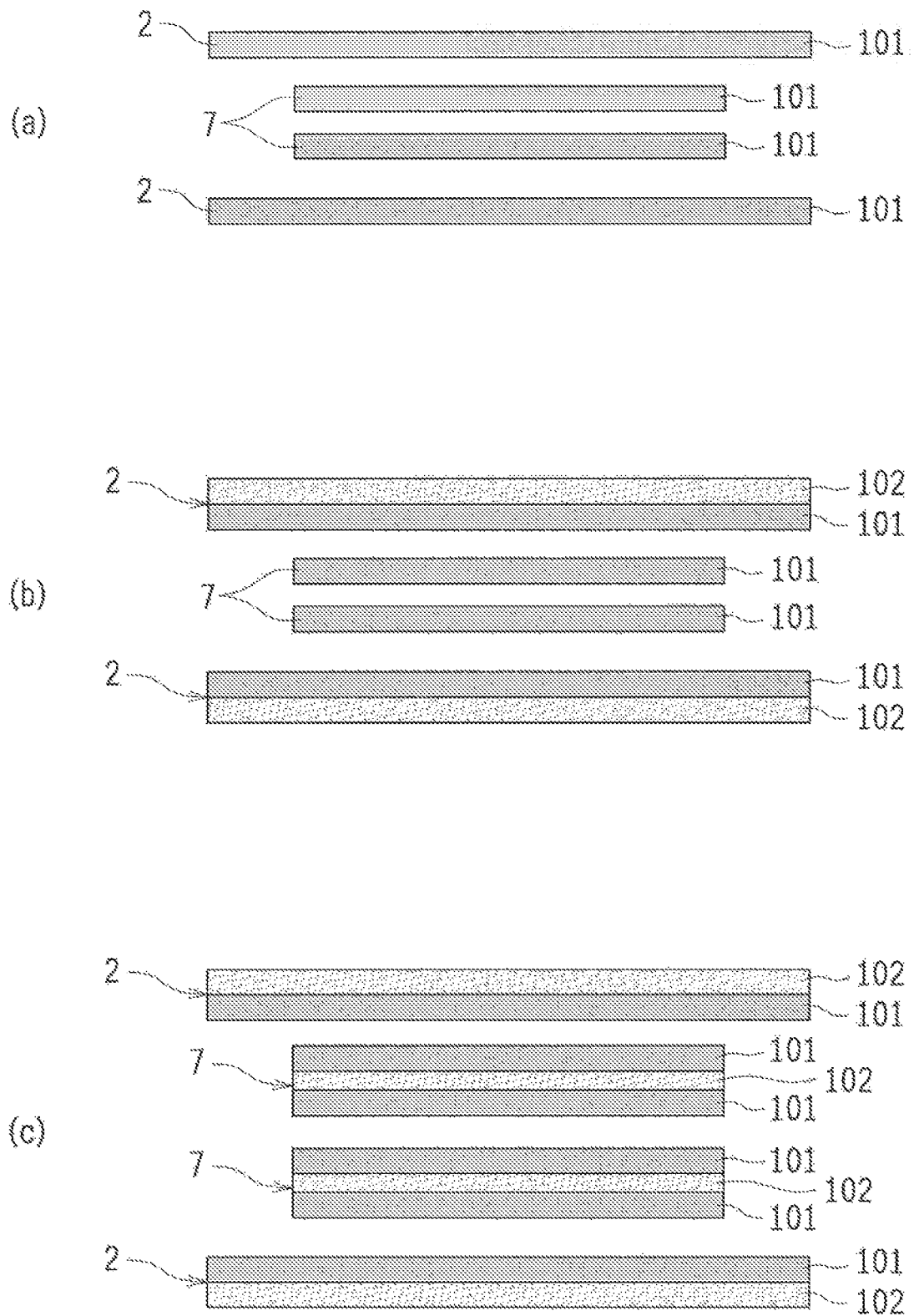
FIG. 9(a) to FIG. 9(c) are cross-sectional views taken along line A-A of FIG. 8, and schematically illustrate configuration examples of a battery case and the negative electrode case included in the metal-air cell.

Described here are configuration examples of the materials of the cell case 2 and the negative electrode case 7 of the metal-air cell 1. FIG. 9(a) to FIG. 9(c) are cross-sectional views taken along line A-A of FIG. 8, and schematically illustrate configuration examples of the battery case 2 and the negative electrode case 7.

Preferably, a material of the cell case 2 may have corrosion resistance against the electrolytic solution, and have heat resistance and thermal adhesiveness. Preferably, a material of the negative electrode case 7 may have insulation property and heat resistance.

As schematically illustrated in FIG. 9(a), for example, the cell case 2 and the negative electrode case 7 can be both formed of a thermally adhesive film layer 101 made of a thermoplastic resin material and having a single-layered structure. Hence, the four peripheries of the cell case 2 are thermally bonded, the heat-sealing portion 73 of the negative electrode case 7 is thermally bonded, and the upper ends of the negative electrode case 7 and the cell case 2 are thermally bonded. Thus, each of the thermally bonded portions can be sealed. Preferably, examples for use in the thermally adhesive film layer 101 include polyethylene film and polypropylene film.

Instead of the single-layered structure, the cell case 2 and the negative electrode case 7 may have a multi-layered structure in which the thermally adhesive film layer 101 and a heat resistance base material layer 102 are stacked together. In such a case, the heat resistance base material layer 102 may preferably include a synthetic-resin-based material having heat resistance. Such a material makes it possible to reduce the risk that the cell case 2 and the negative electrode 7 suffer from an unnecessary deformation and fracture when sealed by thermal bonding. Preferably, examples for use in the heat resistance base material layer 102 include such material as nylon, polyethylene terephthalate (PET), and polybutylene terephthalate (PBT). The heat resistance base material layer 102 may preferably have a thickness ranging from 0.1 to 0.15 mm.

When the cell case 2 is formed in a multi-layered structure including the thermally adhesive film layer 101 and the heat resistance base material layer 102, as illustrated in FIG. 9(b), the cell case 2 is preferably formed in a stacked structure in which the heat resistance base material layer 102 and the thermally adhesive film layer 101 are respectively provided to the outer face and the inner face of the cell case 2. Such a structure ensures the thermal adhesiveness of the inner face of the cell case 2 and makes it possible to enhance the physical rigidity of, and to maintain the shape of, the cell case 2.

Moreover, as illustrated in FIG. 9(c), in addition to the cell case 2 formed in the multi-layered structure including the thermally adhesive film layer 101 and the heat resistance base material layer 102, the negative electrode case 7 may also be formed in the multi-layered structure including the thermally adhesive film layer 101 and the heat resistance base material layer 102. Similar to the case in FIG. 9(b), the cell case 2 may preferably also be formed in a stacked structure in which the heat resistance base material layer 102 and the thermally adhesive film layer 101 are respectively provided to the outer face and the inner face of the cell case 2.

In contrast, the negative electrode case 7 is formed in a multi-layered structure including three layers; that is, the thermally adhesive film layer 101 is provided to a face (an inner face), of the metal negative electrode case 7, facing the metal negative electrode 3, the thermally adhesive film layer 101 is provided to a face (an outer face), of the metal negative electrode case 7, facing the inner face of the cell case 2, and the heat resistance base material layer 102 is sandwiched between the thermally adhesive film layers 101.

Hence, the resulting stacked structure allows the inner faces of the cell case 2, the inner faces of the negative electrode case 7, and the inner face of the cell case 2 and the outer face of the negative electrode case 7 to be thermally bonded accordingly. Thus, the negative electrode case 7 is sealed since the heat-sealing portion 73 is thermally bonded well, and the cell case 2 and the negative electrode case 7 are also thermally bonded and sealed well.

Through the above steps, the metal-air cell 1 can be formed, as illustrated in FIG. 1, in a structure in which the lead 33 of the metal negative electrode 3 can be extended out of the cell case 2 without making contact with the electrolytic solution existing outside the negative electrode case 7. Such a feature makes it possible to reduce the growth of dendrites and the risk of short circuit between electrodes.

Second Embodiment

Figure 10:
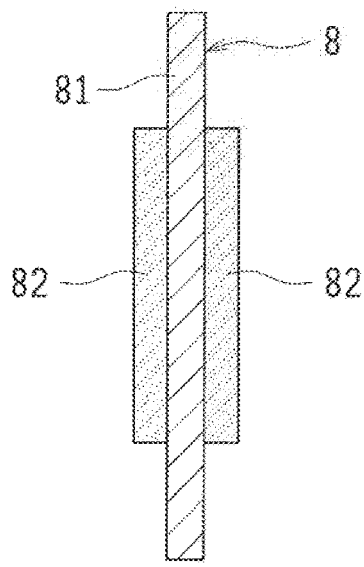
FIG. 10 is a cross-sectional view schematically illustrating a lead included in a metal-air cell according to a second embodiment.
Figure 11:
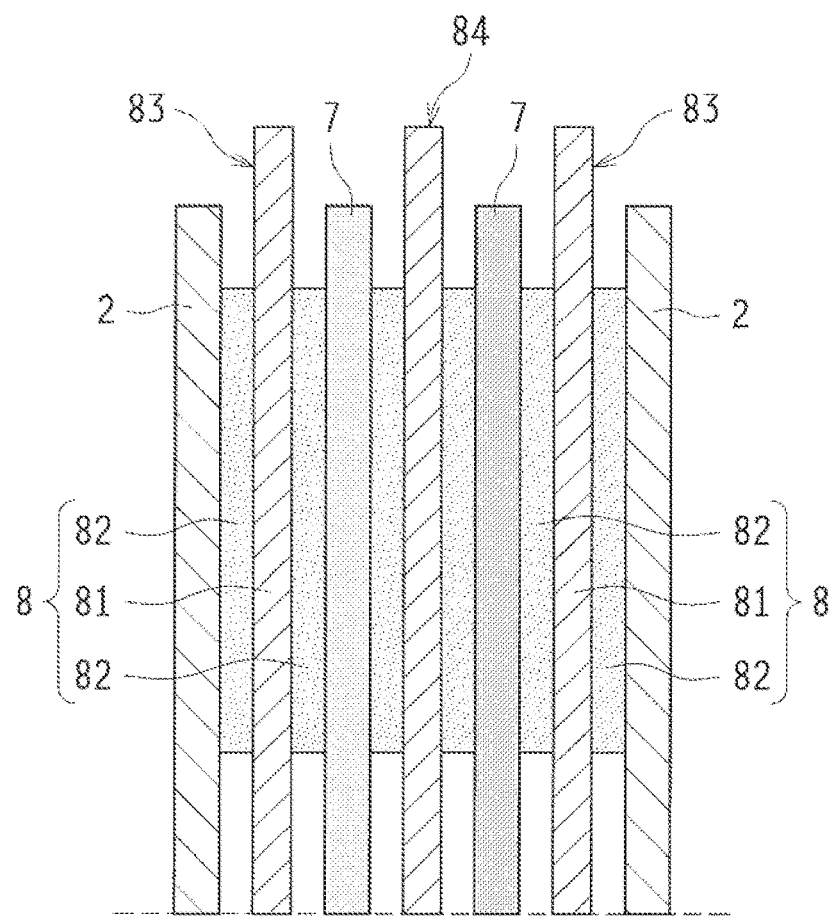
FIG. 11 is a partial cross-sectional view schematically illustrating how to arrange leads in the metal-air cell.

FIG. 10 is a cross-sectional view schematically illustrating a tab lead to be used for the metal-air cell 1 according to a second embodiment. FIG. 11 is a cross-sectional view of an upper portion of the metal-air cell 1, the cross-sectional view schematically illustrating an exemplified application of tab leads for the metal-air cell 1. Note that the metal-air cell 1 according to the second to fifth embodiments described below and the metal-air cell 1 according to the first embodiment have the basic configurations in common. Hence, a specific configuration for each of the embodiments is described in detail. As to the other configurations, the same reference signs as those in the first embodiment are used and details thereof shall be omitted.

In the metal-air cell 1, a tab lead 8 can be used as a lead for each electrode. As illustrated in FIG. 10, the tab lead 8 includes a lead body 81, and a heat resistant insulator 82 provided to the lead body 81. The lead body 81 is made of, for example, aluminum, nickel, titanium, stainless, copper, and an alloy thereof.

The heat resistant insulator 82 is placed in at least a portion, of the tab lead 8, to be sandwiched between the negative electrode case 7 and the cell case 2 when the negative electrode case 7 and the cell case 2 are thermally bonded together. The heat resistant insulator 82 is made of plastic which excels specifically in heat resistance. Preferably, examples of the plastic include polyimide (PI) resin and polyphenylenesulfide (PPS) resin.

In the metal-air cell 1 according to the second embodiment, as illustrated in FIG. 11, the tab lead 8 is (i) connected to the discharge positive electrode 4 and the charge positive electrode 5 to form a positive electrode tab lead 83, and (ii) connected to the metal negative electrode 3 in the negative electrode case 7 to form a negative electrode tab lead 84. Each of the positive electrode tab lead 83 and the negative electrode tab lead 84 has one end extending out of the cell case 2, and another end integrally joined to each of the discharge positive electrode 4, the charge positive electrode 5, and the metal negative electrode 3 in the lower part of the figure.

The heat resistant insulator 82 of the tab lead 8 has heat resistance capable of withstanding a thermal fusion temperature of the thermally adhesive film layer 101 in at least the negative electrode case 7 and the cell case 2. Preferably, the heat resistant insulator 82 may achieve such a requisite performance that the coat of the heat resistant insulator 82 is kept from coming off and flowing away even though the coat is exposed for five seconds at a temperature of 200° C.

Note that when the heat resistant insulator 82 is provided to the entire surfaces of the positive electrode tab lead 83 and the negative electrode tab lead 84, the positive electrode tab lead 83 and the negative electrode tab lead 84 fail to be conductive. Hence, the heat resistant insulator 82 may preferably be provided near line A-A in FIG. 8.

Hence, when the negative electrode case 7 and the cell case 2 is thermally bonded together while the tab lead 8 is sandwiched therebetween, the heat resistant insulator 82 provided to the tab lead 8 can reduce the risk of damage to the negative electrode case 7 and the cell case 2 having contact with the tab lead 8, and of a malfunction caused to the thermally bonded portion by the heat of the tab lead 8.

Third Embodiment

Figure 12:
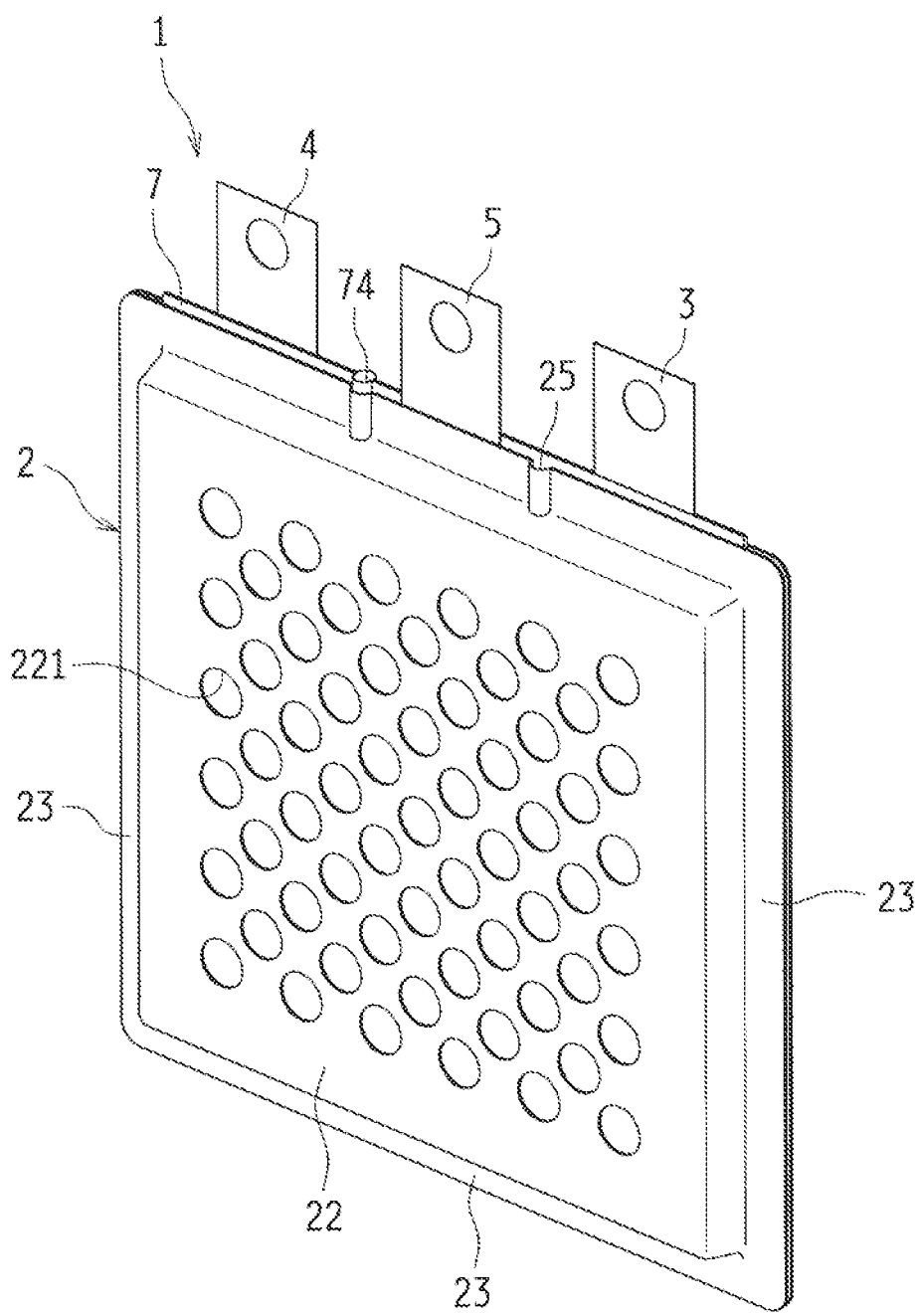
FIG. 12 is a perspective view illustrating a metal-air cell according to a third embodiment.
Figure 13:
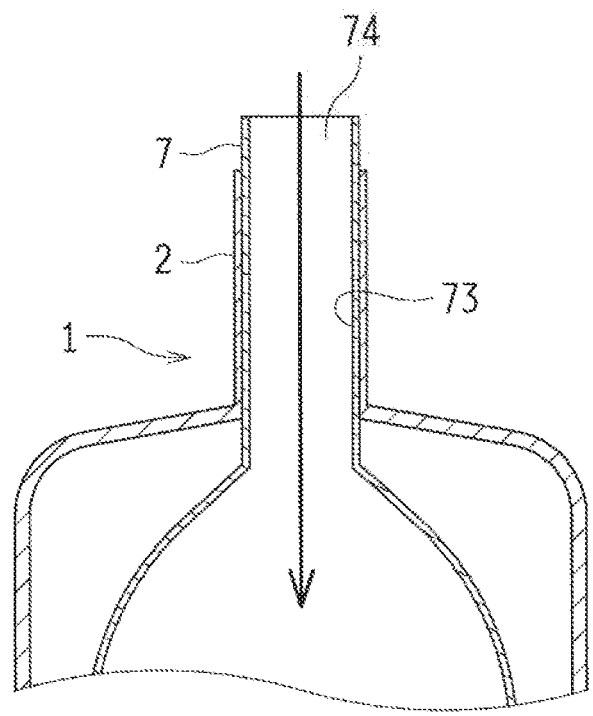
FIG. 13 is a cross-sectional view illustrating a first liquid injection hole of the metal-air cell.
Figure 14:
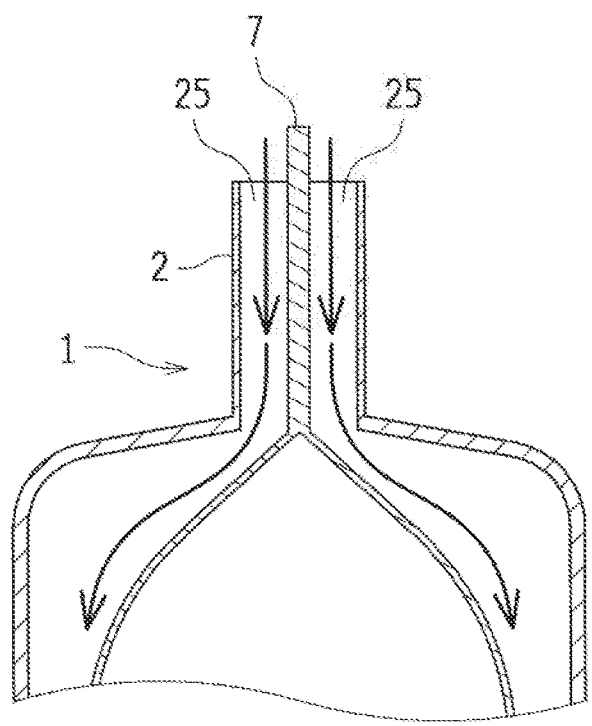
FIG. 14 is a cross-sectional view illustrating a second liquid injection hole of the metal-air cell.

FIGS. 12 to 14 illustrate the metal-air cell 1 according to a third embodiment. FIG. 12 is a perspective view illustrating the metal-air cell 1 according to the third embodiment. FIG. 13 is a cross-sectional view illustrating a first liquid injection hole 74 of the metal-air cell 1. FIG. 14 is a cross-sectional view illustrating a second liquid injection hole 25 of the metal-air cell 1. Note that for the sake of convenience in viewing the drawings, FIGS. 13 and 14 omit the illustrations of the metal negative electrode 3, the discharge positive electrode 4, and the charge positive electrode 5.

In the metal-air cell 1 according to this embodiment, an upper end of the cell case 2 includes a plurality of liquid injection holes. The liquid injection holes are provided to an upper portion of the cell case 2, and each arranged between the leads of the metal negative electrode 3, the discharge positive electrode 4, and the charge positive electrode 5.

One of the liquid injection holes; namely the first liquid injection hole 74, is provided to communicate with the inside of the negative electrode case 7. Specifically; a portion of the heat-sealing portion 73 of the negative electrode case 7 is left unbonded as a substantially cylindrical hollow communicating between the inside and the outside of the negative electrode case 7, such that the cylindrical hollow is formed to be the first liquid injection hole 74. The cell case 2 is bonded to the outer face of the first liquid injection hole 74, such that the inside and the outside of the cell case 2 are sealed.

Another one of the liquid injection holes; namely the second liquid injection hole 25, is provided to communicate with the inside of the cell case 2. In this case, a portion of the outer face of the negative electrode case 7 and a portion of the inner face of the cell case 2 are left unbonded as a hollow between the outer face of the sealed negative electrode case 7 and the inner face, of the cell case 2, facing the outer face, such that the hollow is formed to be the second liquid injection hole 25. The second liquid injection hole 25 communicates with the outside of the negative electrode case 7 in the cell case 2.

As illustrated in FIG. 12, the appearance of the metal-air cell 1 can show the first liquid injection hole 74 is formed on the negative electrode case 7 and the second liquid injection hole 25 is formed on the cell case. Hence, it is easily recognized whether the electrolytic solution is injected in which liquid injection hole. Each of the first liquid injection hole 74 and the second liquid injection hole 25 does not have to be provided in one position of the metal-air cell 1.

Alternately, the first liquid injection hole 74 and the second liquid injection hole 25 may be provided to multiple positions of the metal-air cell 1.

In the sealing the case of the metal-air cell 1, the first liquid injection hole 74 is formed in the following manner: A spacer made of, for example, polytetrafluoroethylene (PTFE) which is less likely to bond with the negative electrode case 7 (the thermally adhesive film layer 101, for example) is held in the heat-sealing portion 73 and thermally bonded. Then, the spacer is removed from the heat-sealing portion 73.

Then, as illustrated in FIG. 13, the electrolytic solution is injected from the first liquid injection hole 74 into the negative electrode case 7. Hence, the inside of the negative electrode case 7 (the metal negative electrode 3) is filled with the electrolytic solution. After the electrolytic solution is injected, the first liquid injection hole 74 is sealed either by thermal bonding or with a plug inserted in the first liquid injection hole 74.

Similarly, a spacer made of, for example, polytetrafluoroethylene (PTFE) which is less likely to bond with the cell case 2 (the thermally adhesive film layer 101, for example) is provided between the outer face of the negative electrode case 7 and the inner face of the cell case 2, so that the second liquid injection hole 25 is formed. Then, the cell case 2 is sealed.

Then, as illustrated in FIG. 14, the electrolytic solution is injected from the second liquid injection hole 25 into the cell case 2. The electrolytic solution flowing from the second liquid injection hole 25 fills the outside of the negative electrode case 7 in the cell case 2. Hence, the inside of the cell case 2 (the discharge positive electrode 4 and the charge positive electrode 5) can be immersed in the electrolytic solution.

Note that, after the electrolytic solution is injected, the first liquid injection hole 74 and the second liquid injection hole 25 may be left unsealed, so that the unsealed holes may be used as gas releasing holes.

Fourth Embodiment

Figure 15:
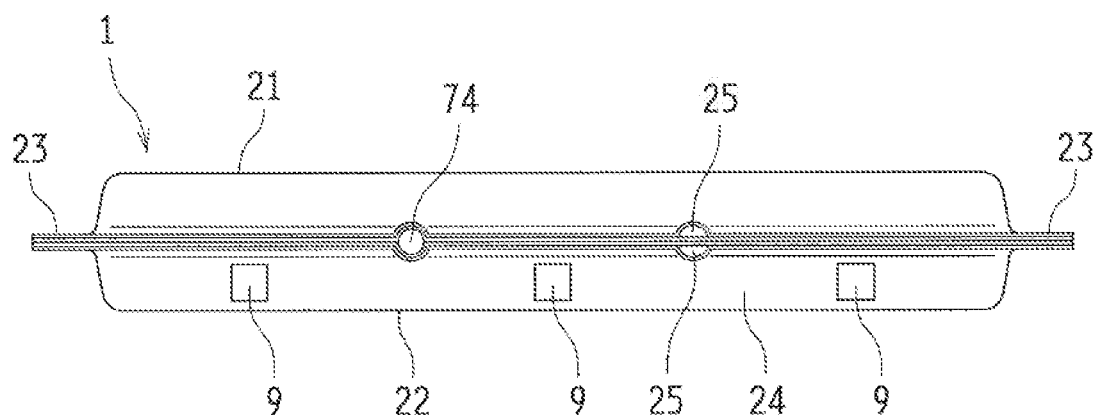
FIG. 15 is a top view illustrating a metal-air cell according to a fourth embodiment.
Figure 16:
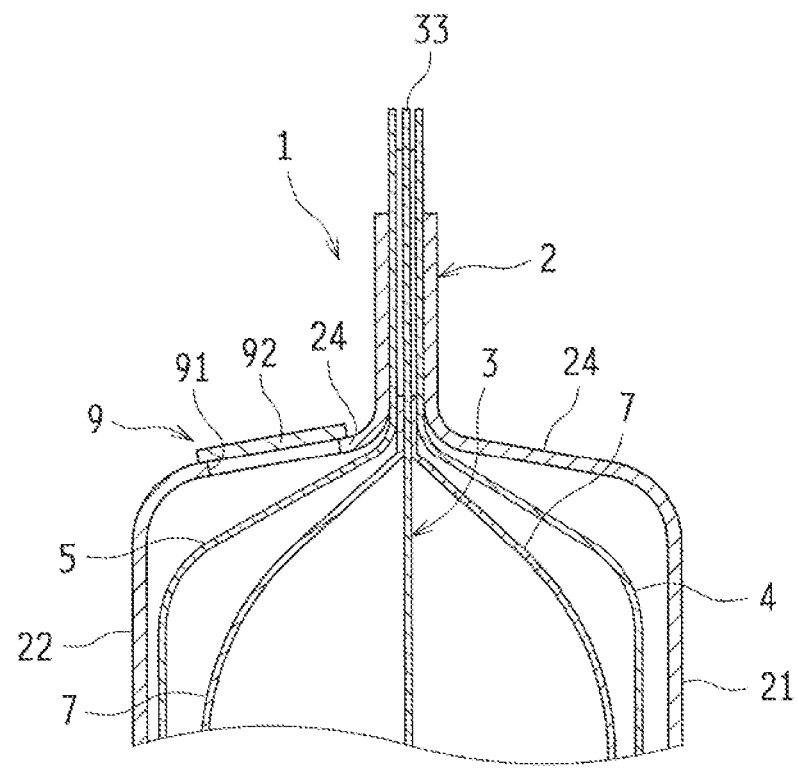
FIG. 16 is a cross-sectional view illustrating an upper portion of the metal-air cell.

FIG. 15 is a top view illustrating the metal-air cell 1 according to a fourth embodiment. FIG. 16 is a cross-sectional view illustrating an upper portion of the metal-air cell 1 according to the fourth embodiment. The metal-air cell 1 according to this embodiment is the metal-air cell 1 described in the third embodiment further including a gas releaser 9.

As illustrated, the cell case 2 includes a top face 24 formed of the first main wall 21 and the second main wall 22 bent in a direction to meet the metal negative electrode 3. The top face 24 of the cell case 2 is provided with a plurality of gas releasing holes 91 each passing through, and communicating between the inside and outside of, the cell case 2. The gas releaser 9 is formed of the gas releasing hole 91 with a blocking membrane 92 bonded therewith.

The blocking membrane 92 is a porous material containing water-repellent resin, making it possible to maintain the cell case 2 to be liquid-tight and reduce the leak of the electrolytic solution. An example of the blocking membrane 92 includes a film material or a sheet material having corrosion resistance against such electrolytic solutions as polytetrafluoroethylene (PTFE) and perfluoroalkoxy alkane (PFA).

Hence, when the inner pressure of the cell case 2 rises to a certain level or above, the gas releaser 9 provided to the cell case 2 opens to facilitate ejection of gas inside the cell case 2. The blocking membrane 92 may be attached to the gas releasing hole 91 either on the outer face or on the inner face of the cell case 2.

At least one of gas releasers 9, including the gas releaser 9 and provided to the cell case 2, is placed close to the charge positive electrode 5. In the metal-air cell 1 described as an example, the gas releasers 9 provided to the cell case 2 are placed close to the charge positive electrode 5 (close to the second main wall 22). Hence, oxygen generated in the proceeding charge reaction diffuses inside holes of the porous charge positive electrode 5. Then, the oxygen is guided to the upper portion of the cell case 2, and ejected from the gas releasers 9. Similar gas releasers 9 provided to the cell case 2 may be placed close to the discharge positive electrode 4.

Fifth Embodiment

Figure 17:
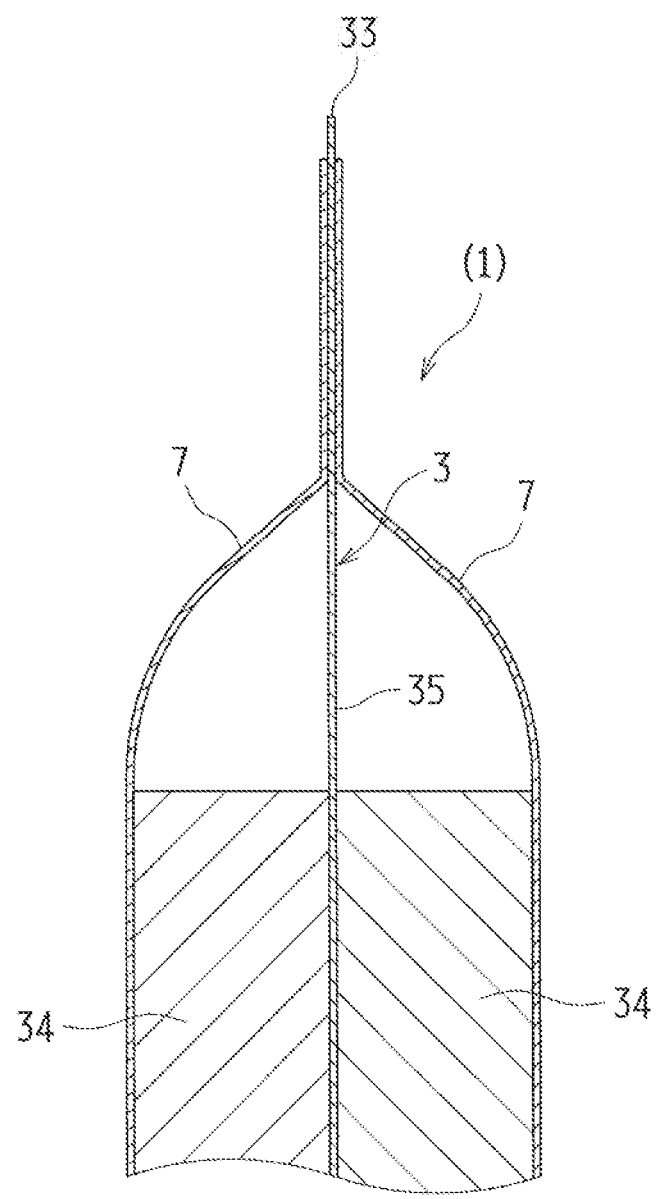
FIG. 17 is a cross-sectional view illustrating an upper portion of a metal-air cell according to a fifth embodiment.

FIG. 17 illustrates the metal-air cell 1 according to a fifth embodiment in the form of a cross-sectional view illustrating an upper portion of the metal-air cell 7 of the metal-air cell 1. In this embodiment, the negative electrode case 7 is formed of a material which enables the negative electrode case 7 to be used as a separator, of the metal-air cell 1, allowing for movement of charge carriers.

Specifically, the negative electrode case 7 is formed of a porous membrane or a non-woven fabric made of such resins as polyethylene (PE), polypropylene (PP), polyester, cellulose, and polyimide. Preferably, the negative electrode case 7 may be formed of a porous membrane made of such polyolefin-based resins as polyethylene and polypropylene. In this case, the negative electrode case 7 may have a single-layered structure including a single porous membrane or non-woven fabric. The negative electrode case 7 may also have a multi-layered structure including two or more types of porous membranes or non-woven fabrics each of which differs in average thickness, characteristic such as porosity, and material. Moreover, the negative electrode case 7 and the separator 6 described in the first embodiment may be formed of a common material, and the material may be an anion-exchange membrane.

Since the negative electrode case 7 is made of a material enabling the negative electrode case 7 to be used as a separator, the negative electrode case 7 itself can include the porous structure unit 71. The negative electrode case 7 does not have to be provided with the opening 72 as illustrated, for example, in FIG. 5. Such a feature eliminates the need for steps of providing the opening 72 and of providing the separator 6 to the opening 72 in the forming of the negative electrode case. Hence, the forming of the negative electrode case is significantly simplified, contributing to an increase in productivity.

As can be seen, in the metal-air cell 1 and the method for manufacturing the metal-air cell 1 according to the present disclosure, the negative electrode case 7 contains the metal negative electrode 3. Such a structure allows the lead 33 of the metal negative electrode 3 to extend out of the cell case 2 without making contact with the electrolytic solution outside the negative electrode case 7. Hence, generation of dendrites outside the negative electrode case 7 is reduced, making it possible to reduce the risk of short cut of the metal negative electrode 3, the discharge positive electrode 4, and the charge positive electrode 5. Such a feature makes it possible to maintain charge characters and discharge characteristics stable in long term without deteriorating those characteristics even after a charge-discharge cycle. Moreover, the negative electrode case 7 provided can reduce deformation and expansion of the metal negative electrode 3, making it possible to reduce such a risk as a fracture in a bonded portion caused by internal expansion.

The above metal-air cell 1 is applicable for forming a battery-cell stack. For example, as illustrated in FIG. 18(a) and FIG. 18(b), a battery-cell stack 10 includes a cell stack body 11 having: end plates 111 each provided to a longitudinally opposing one of ends of the cell stack body 11; and a plurality of supports 112 installed between the end plates 111. Between the end plates 111 of the cell stack body 11, a plurality of metal-air cells 1 acting as battery cells 12 are arranged with a spacer 13 interposed between the metal-air cells 1 and electrically connected to one another. The spacer 13 between the battery cells 12 can maintain a mutual distance between the battery cells 12, and support the outer faces of the battery cells 12 to reduce the risk of deformation of the battery cells 12. In such a case, in the battery-cell stack 10, the battery cells 12 are arranged in parallel with the direction of the air to be taken. Such an arrangement allows the spacer 13 to secure an air flow path, contributing to equally distributing the air among the air inlets 211 of the battery cells 12.

The present disclosure shall not be limited to the embodiments described above, and can be modified in various manners within the scope of claims. The technical aspects disclosed in different embodiments are to be appropriately combined together to implement an embodiment. Such an embodiment shall be included within the technical scope of the present disclosure.

The present application claims priority to Japanese Patent Application No. 2017-152640, filed Aug. 7, 2017, the contents of which are incorporated herein by reference in its entirety.

REFERENCE SIGNS LIST

1 Metal-Air Cell
2 Cell Case
21 First Main Wall
211 Air Inlet
22 Second Main Wall
221 Gas Outlet
23 Side Wall
24 Top Face
25 Second Liquid Injection Hole
3 Metal Negative Electrode
31 First Negative Electrode Surface
32 Second Negative Electrode Surface
33 Lead
34 Negative Electrode Active Material Layer
35 Negative Electrode Current Collector
4 Discharge Positive Electrode
41 Discharge Positive Electrode
42 Discharge Positive Electrode Catalyst Layer
43 Water-Repellent Membrane
5 Charge Positive Electrode
51 Water-Repellent Membrane
6 Separator
7 Negative Electrode Case
71 Porous Structure Unit
72 Opening
73 Heat-Sealing Portion
74 First Liquid Injection Hole
101 Thermally Adhesive Film Layer
102 Heat Resistance Base Material Layer
8 Tab Lead
81 Lead Body
82 Heat Resistant Insulator
83 Positive Electrode Tab Lead
84 Negative Electrode Tab Lead
9 Gas Releaser
91 Gas Releasing Hole
92 Blocking Membrane
10 Battery-Cell Stack

The invention claimed is:

1. A metal-air cell comprising:
a negative electrode;
a negative electrode case housing the negative electrode and sealed while a lead of the negative electrode extends from the negative electrode case, the negative electrode case comprising a separator that forms at least part of the negative electrode case;
an air electrode facing the negative electrode across the separator; and
a cell case housing the negative electrode case and the air electrode and sealed while the lead of the negative electrode extends from the cell case and a lead of the air electrode extends from the cell case; wherein
the negative electrode case further comprises a first container comprising a thermoplastic resin material,
the first container houses the negative electrode, is sealed while the lead of the negative electrode extends from the first container, and defines a first opening, and
the separator covers the first opening.

2. The metal-air cell according to claim 1, wherein the separator covers the first opening from an inside of the negative electrode case.

3. The metal-air cell according to claim 1, further comprising:
a positive electrode facing the negative electrode across the separator and housed in the cell case, wherein
the cell case is sealed while a lead of the positive electrode extends from the cell case.

4. The metal-air cell according to claim 3, wherein
the separator includes a first separator and a second separator,
the first container further defines a second opening,
the negative electrode is located between the first opening and the second opening,
the first separator covers the first opening and is located between the negative electrode and the air electrode, and
the second separator covers the second opening and is located between the negative electrode and the positive electrode.

5. The metal-air cell according to claim 1, wherein
the first container has a laminate structure including a thermally adhesive film layer made of the thermoplastic resin material and a heat resistance base material layer, and
the thermally adhesive film layer is inside the heat resistance base material layer.

6. The metal-air cell according to claim 5, wherein
the negative electrode case is sealed by welding the thermally adhesive film layer, the thermally adhesive film layer being provided to an inner face of the first container while sandwiching the lead of the negative electrode.

7. The metal-air cell according to claim 1, wherein
the first container has a laminate structure including a first thermally adhesive film layer and a second thermally adhesive film layers-layer each made of the thermoplastic resin material, and a heat resistance base material layer sandwiched between the first thermally adhesive film layer and the second thermally adhesive film layer-slayer.

8. The metal-air cell according to claim 1, wherein
the cell case comprises a first water-repellant membrane, a second water-repellent membranes, and a second container,
the second container has defines a second opening and a third opening and comprises a thermally adhesive film layer,
the first water-repellent membrane covers the second opening and faces the air electrode, and
the cell case is sealed via the thermally adhesive film layer.

9. The metal-air cell according to claim 3, wherein
the cell case comprises a first water-repellant membrane, a second water-repellent membrane, and a second container,
the second container defines a first opening and a second opening, and comprises a third thermally adhesive film layer,
the first water-repellent membrane covers the first opening of the second container and faces the air electrode,
the second water-repellent membrane covers the second opening of the second container and faces the positive electrode,
the cell case is sealed via the third thermally adhesive film layer while sandwiching the lead of the air electrode and the lead of the positive electrode, and
the lead of the air electrode and the lead of the positive electrode do not overlap each other.

10. The metal-air cell according to claim 1, wherein
an end of the negative electrode case has a portion of the lead of the negative electrode extending therefrom, and
the portion of the lead of the negative electrode protrudes further away from an end of the cell case provided outside the end of the negative electrode case.

11. The metal-air cell according to claim 10, wherein
the end of the cell case, having a portion of the lead of the air electrode extending therefrom, is sealed while sandwiching the lead of the air electrode and the end of the negative electrode case.

12. The metal-air cell according to claim 3, wherein
an end of the negative electrode case has a portion of the lead of the negative electrode extending therefrom,
the portion of the lead of the negative electrode protrudes further away from an end of the cell case provided outside the end of the negative electrode case, and
the end of the cell case, having a portion of the lead of the air electrode extending therefrom and a portion of the lead of the positive electrode extending therefrom, is sealed while sandwiching the lead of the air electrode, the lead of the positive electrode, and the end of the negative electrode case.

* * * * *